US006865983B2

(12) United States Patent
McNamee

(10) Patent No.: US 6,865,983 B2
(45) Date of Patent: Mar. 15, 2005

(54) FRYING APPARATUS

(75) Inventor: Ronan McNamee, Dartry (IE)

(73) Assignee: Irish Bakery Inventions Limited, Dublin (IE)

( * ) Notice: Subject to any disclaimer, the term of this patent is extended or adjusted under 35 U.S.C. 154(b) by 25 days.

(21) Appl. No.: 10/611,469

(22) Filed: Jun. 30, 2003

(65) Prior Publication Data

US 2004/0060453 A1 Apr. 1, 2004

(30) Foreign Application Priority Data

Jul. 5, 2002 (IE) .......................................... S2002/0561

(51) Int. Cl.[7] .............................................. A47J 37/08
(52) U.S. Cl. ............................. 99/404; 99/330; 99/407; 99/408; 99/443 C
(58) Field of Search ................... 99/330–334, 403–418, 99/443 R, 386, 443 C; 426/438, 307, 570, 511; 432/523, 23, 37; 210/167, DIG. 8; 126/391.1, 376.1

(56) References Cited

U.S. PATENT DOCUMENTS

| | | | | |
|---|---|---|---|---|
| 2,538,937 | A | * 1/1951 | Foster | 99/404 |
| 3,340,792 | A | 9/1967 | Matzke | 99/405 |
| 3,603,243 | A | * 9/1971 | Foster | 99/355 |
| 3,757,672 | A | 9/1973 | Szabrak et al. | 99/404 |
| 3,793,937 | A | * 2/1974 | Lipoma | 99/355 |
| 3,812,775 | A | * 5/1974 | Sijbring | 99/404 |
| 3,819,837 | A | 6/1974 | Keith et al. | 426/27 |
| 4,689,236 | A | 8/1987 | Pinto | 426/502 |
| 4,694,742 | A | * 9/1987 | Dover | 99/404 |
| 4,694,743 | A | * 9/1987 | Groff | 99/405 |
| 5,322,006 | A | * 6/1994 | Morioka et al. | 99/405 |
| 5,493,956 | A | * 2/1996 | Larsen | 99/404 |
| 5,580,598 | A | * 12/1996 | Benson et al. | 426/438 |
| 5,630,358 | A | 5/1997 | Patel | 99/349 |
| 5,673,609 | A | 10/1997 | Sanchez et al. | 99/353 |
| 5,988,051 | A | * 11/1999 | Hashiguchi et al. | 99/472 |
| 6,073,540 | A | * 6/2000 | Garrett | 99/330 |
| 6,245,370 | B1 | 6/2001 | Pilati et al. | 426/289 |
| 6,467,398 | B2 | * 10/2002 | Fink et al. | 99/330 |
| 6,467,401 | B2 | * 10/2002 | Caridis et al. | 99/353 |

FOREIGN PATENT DOCUMENTS

| | | |
|---|---|---|
| DE | 2159074 | 5/1972 |
| DE | 20014175 | 12/2000 |
| EP | 0382105 | 8/1990 |
| EP | 0 903 084 | 3/1999 |
| GB | 767 255 | 1/1957 |
| GB | 2151174 | 7/1985 |
| IE | 960202 | 10/1996 |
| JP | 5177590 | 7/1993 |

OTHER PUBLICATIONS

U.S. Appl. No. 10/611,462, McNamee, filed Jul. 2003.
U.S. Appl. No. 10/611,463, McNamee, filed Jul. 2003.
Search report GB 0315424.2, Nov. 24, 2003.
Search report GB 0315435.8, Jan. 6, 2004.
Search report GB 0315243.6, Dec. 23, 2003.

* cited by examiner

Primary Examiner—Timothy F. Simone
(74) Attorney, Agent, or Firm—Baker Donelson Bearman Caldwell & Berkowitz

(57) ABSTRACT

A frying apparatus (1) for frying a food product comprises a container (20) and at least one conveying device (201, 202, 203, 204) and corresponding at least one submerging device (301, 302, 303, 304). The submerging device is adapted to be moved between an out-of-use mode in which it is in a raised position and an in-use mode in which it is in a lowered position and is operative to hold the food product down on the conveyor belt. In use, oil at a pre-determined elevated temperature is held in the container and the conveying device for carrying the food product is located underneath the surface of the liquid with food product carried on the conveying device being held down under the surface of the liquid by the submerging device thereby preventing the food product from floating to the surface of the liquid, ensuring effective and consistent cooking of the food product.

10 Claims, 4 Drawing Sheets

FRYING APPARATUS

The present invention relates to a frying apparatus and in particular to an improved frying apparatus for foods that are buoyant in oil.

Many food products are prepared utilising a frying apparatus to deep or shallow fry them in oil. An example of such a food product is doughnuts. However, doughnuts, like many other foods, are buoyant in hot oil and tend to float to the surface of the hot oil during the cooking process. This can result in uneven cooking of the doughnut or other food product. Very often, in an effort to ensure that the doughnuts are cooked properly, they are left in the hot oil for a longer period of time than is necessary. This can result in the doughnuts becoming overcooked or burnt.

A known apparatus conveys a food product through a continuous vat of hot oil for the cooking period. The food product is turned once during the cooking period in an effort to ensure that it is cooked evenly. However the problem of the food product floating on the surface of the hot oil remains, often leading to unevenly cooked food product or overcooked food product if it remains in the oil for too long a period of time.

It is an object of the present invention to seek to alleviate the aforementioned problems.

The present invention accordingly provides a frying apparatus for frying a food product, the apparatus comprising a container having an entry side and an exit side, and including at least one conveying device for conveying food product from the entry side through the container to the exit side, and further including at least one submerging device, the submerging device being located above the conveying device and being adapted to be moved between an out-of-use mode in which it is in a raised position and an in-use mode in which it is in a lowered position and is operative to hold the food product down on the conveyor belt, whereby, in use, a liquid at a pre-determined elevated temperature is held in the container, the conveying device for carrying food product is located underneath the surface of the liquid, and the submerging device is in the in-use mode with the food product carried on the conveying device being held down under the surface of the liquid by the submerging device thereby preventing the food product from floating to the surface of the liquid, ensuring effective and consistent frying of the food product, the apparatus further including a food product transferring device for transferring the product from a first conveying device in a first section of the container to a second conveying device in a second section of the container, the food product transferring device including a rotatable shaft having a plurality of vanes fixedly mounted thereon, the vanes being adapted for receiving food product emerging from the first conveying device and transferring said food product to the second conveying device by rotation of the transferring device such that product emerging from the first conveying device is received onto a vane and carried on the vane, through an arcuate path until the product falls from the vane onto the second conveying device, the food product transferring device being moveable between two alternative positions, a first position in which the product is flipped upside down through a 180° angle as the product is transferred from one section to another section; and a second position in which the product is conveyed from one section to another section without being flipped through a 180° angle.

Preferably, the conveying device comprises a conveyor belt.

Advantageously, the submerging device includes a submerging belt and the submerging belt may be a wire mesh type of conveyor. The speed at which the submerging belt is travelling can be varied so that the speed of the submerging belt corresponds with that of the conveyor belt.

Preferably, when the submerging device is in the in-use mode, (i.e. in the lowered position), the submerging belt is in direct contact with the food product on the conveyor belt and, in use the submerging belt is substantially submerged under the surface of the liquid in the container.

Advantageously the submerging belt is positioned directly above the conveyor belt, with a pre-defined distance between the submerging belt and the conveyor belt, this distance being determined by the thickness of the product being conveyed through the liquid within the container. This distance is pre-set for a particular product and remains at this pre-set distance while the apparatus is in operation. The distance can be altered to accommodate different products when the apparatus is not in operation.

Preferably the container includes a temperature control device so that in use, temperature of the liquid (oil) in the container can be controlled.

Ideally, the container (frying bath) includes a plurality of frying bath sections, each section including a conveyor belt and a corresponding submerging belt.

The submerging belt in each section is used to hold the product in a submerged position under the surface of the oil, as the product is conveyed through the different sections of the container.

Ideally, the vanes have a flat surface for receiving a food product and are arranged equi-distant from each other about the shaft.

The food product transferring device is moveable between the first and second position by movement in a slot provided in a guide member. Conveniently, the first position (position I) of the food product transferring device in which the food product is flipped upside down during transferral, occurs when the transferring device is in an upper position. Thus, the second position (position II) of the transferring device in which the food product is transferred from one section of the container (frying bath) to another section of the container without being flipped upside down, occurs when the transferring device is in a lower position.

Advantageously, the temperature in any section of the container is controlled independently of the temperature in any other section, thereby enabling the product to be conveyed through a plurality of temperatures as may be required by the cooking process. For example, the product may be initially submerged in a first section at a high temperature enabling the product to form a cooking seal. It may be desirable for the product to be conveyed quite rapidly through this first section of the container. Further cooking of the product through the remaining sections of the container may take place at lower temperatures and the product may be conveyed quite slowly relative to the speed at which it was conveyed through the first section. This has the advantage of ensuring that the product is cooked properly.

One embodiment of the apparatus of the invention will now be described by way of example only and with reference to the accompanying drawings in which.

Figure 2:
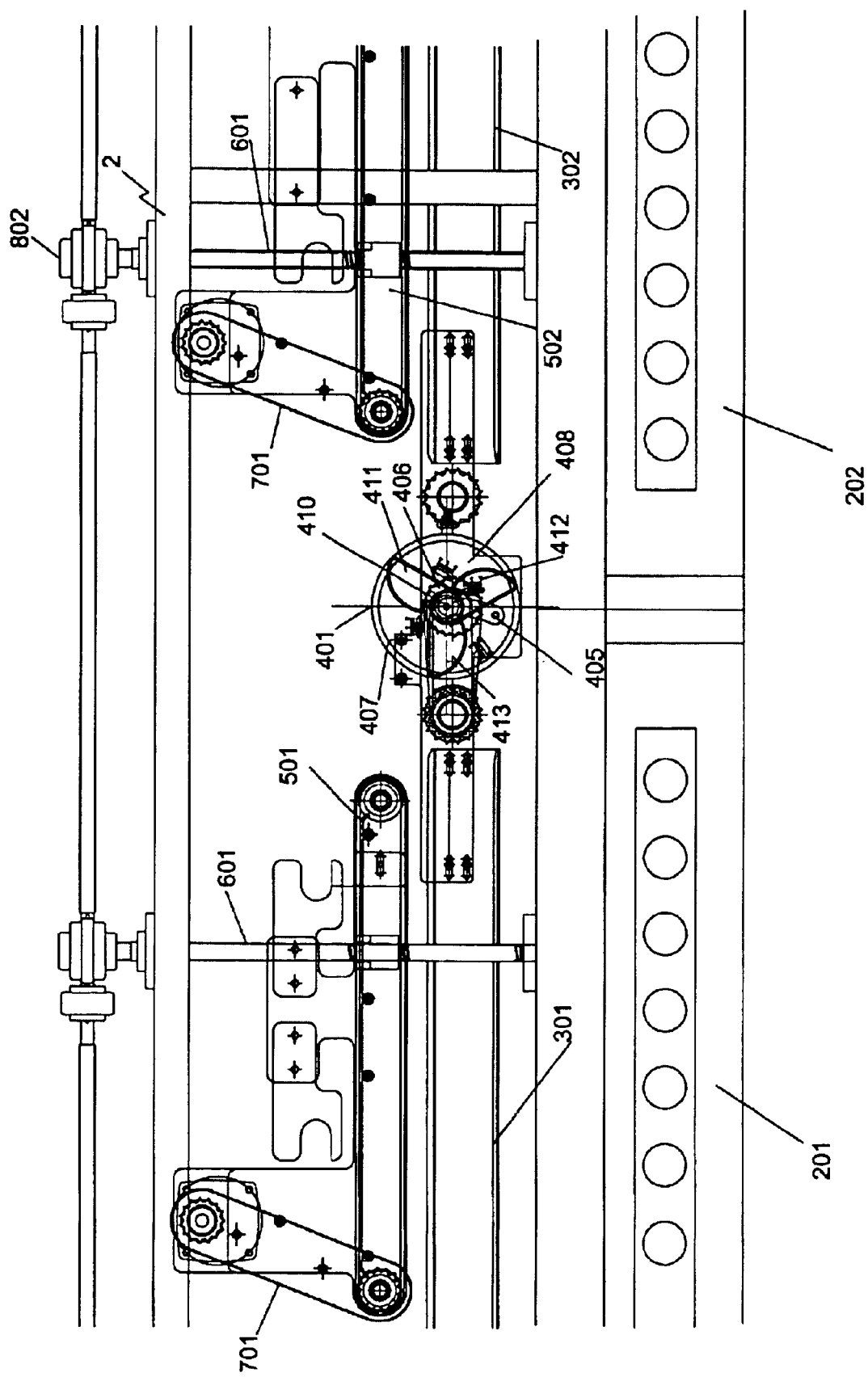
FIG. 2 is a magnified side view of the junction between a first section and a second section of the frying apparatus showing the food product transferring device in a first position (indicated as position I) in which the food product is transferred from a first conveyor belt to a second conveyor belt with the product being flipped upside down.
Figure 2A:
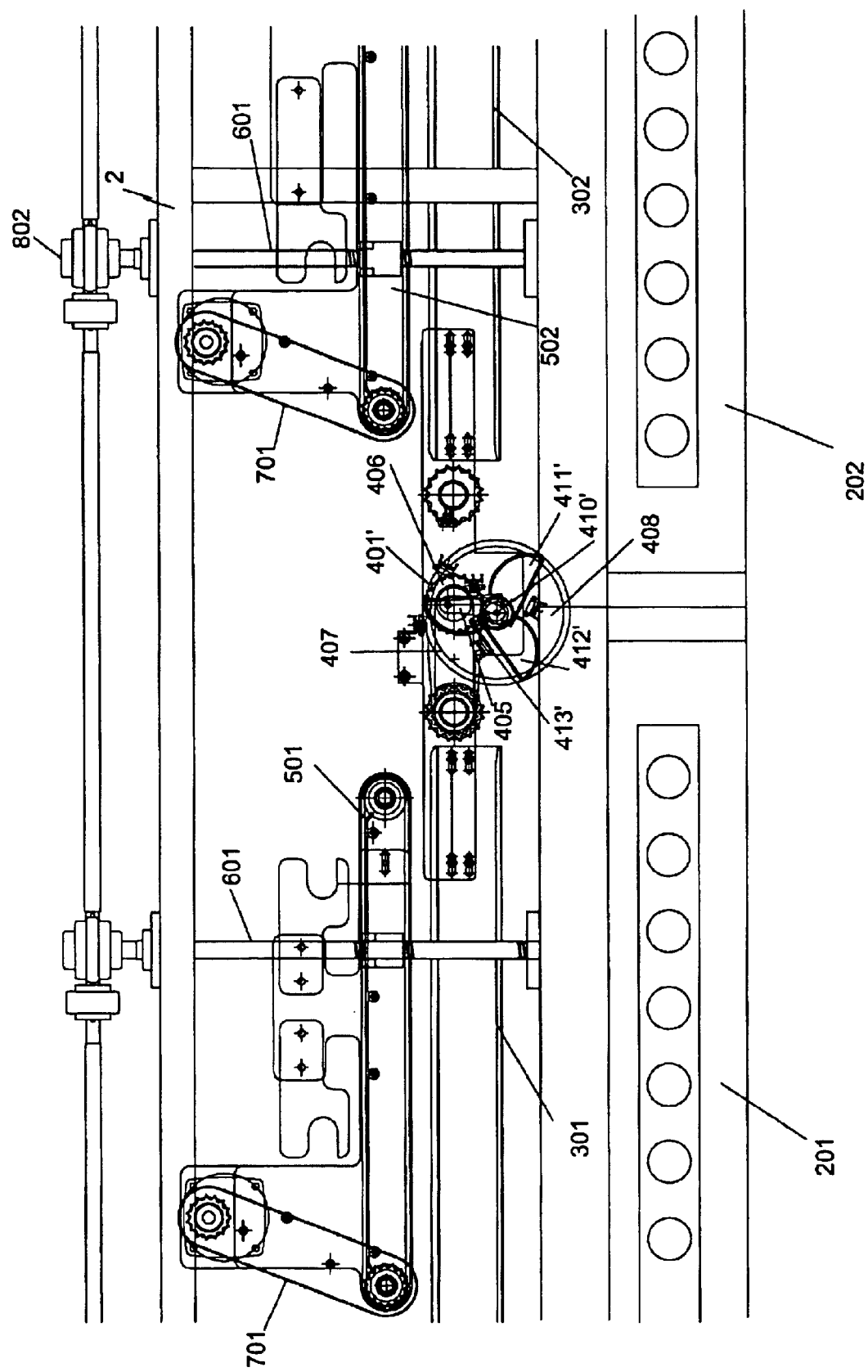
FIG. 2a is a magnified side view as in FIG. 2 except that the food product transferring device is shown in a second position (indicated as position II) in which the food product is transferred to the second conveyor belt without being flipped upside down (i.e. same side of product facing up on first and second conveyor belts).
Figure 3:
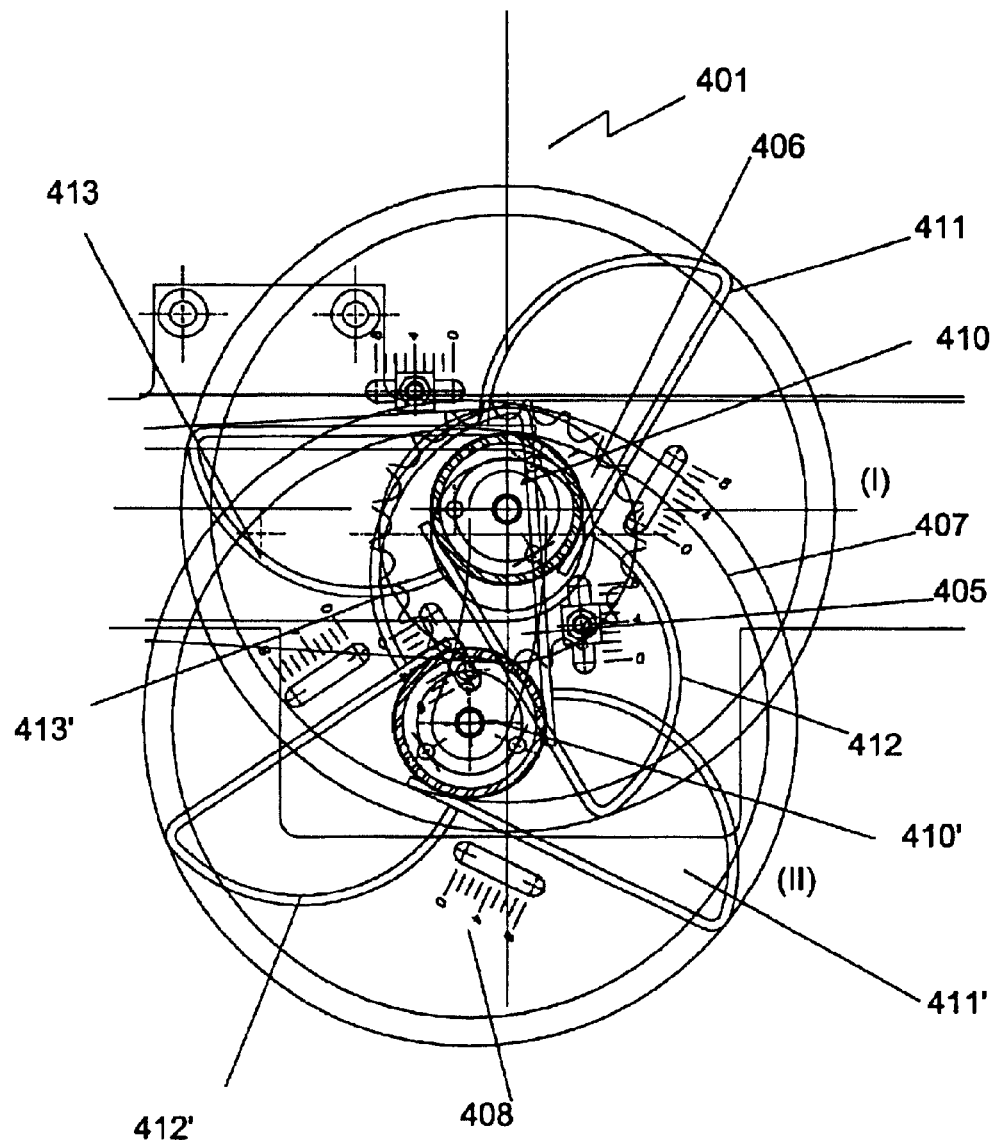

For clarity, the conveyor belts are shown in an elevated position in FIGS. 2 and 2a; it will of course be understood that in their normal working position, the conveyor belts are positioned lower so that they are submerged in the oil held in the frying bath;

FIG. 3 is a magnified side view of a food product transferring device of the flying apparatus showing the transferring device in the two alternative positions (Position (I) and Position (II)).

Figure 1:
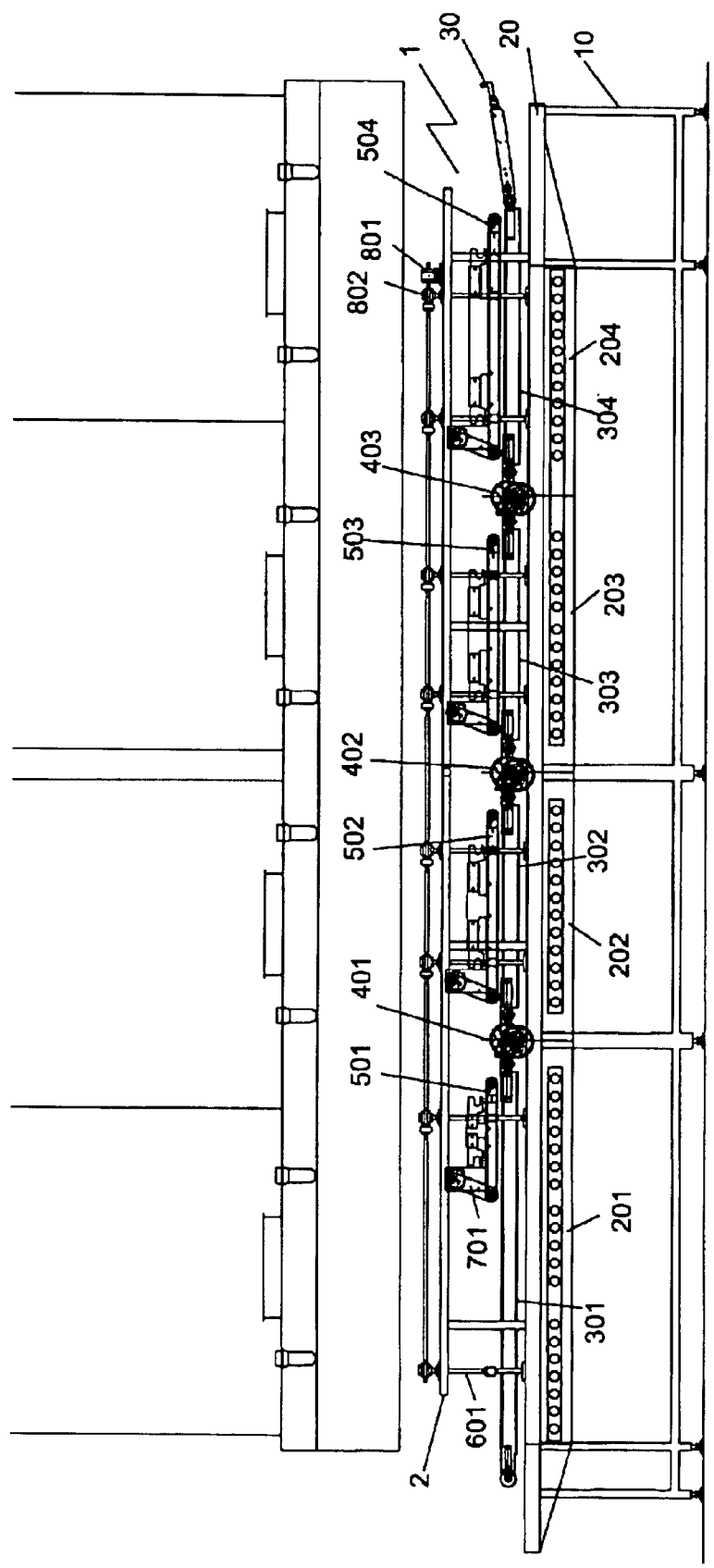
FIG. 1 is a side view of a frying apparatus of the invention in a preferred embodiment.

Referring to the drawings and initially to FIG. 1, the frying apparatus of the invention is shown in a preferred embodiment indicated generally by the reference numeral 1. The frying apparatus comprises a container 20 supported by a plurality of vertical legs 10. The container 20 is divided into four sections, namely a first section 201, a second section 202, a third section 203 and a fourth section 204. Each section 201, 202, 203, 204 of the container 20 is equipped with a conveyor belt 301, 302, 303, 304 and a respective corresponding submerging device including a submerging belt 501, 502, 503, 504, respectively. The product traverses through a longitudinal travel path through each of the sections 201, 202, 203, 204 resting on the conveyor belts 301, 302, 303, 304 and eventually emerging at an exit point 30.

The submerging belts 501, 502, 503, 504 are used to hold the product in position on the conveyor belts 301, 302, 303, 304, respectively, i.e. the submerging belts 501, 502, 503, 504, prevent the product from floating to the surface when the conveyor belts 301, 302, 303, 304 are submerged beneath the surface of the liquid contained in the first, second, third and fourth sections 201, 202, 203, 204 respectively, of the container 20. The distance between the conveyor belts 301, 302, 303, 304 and the submerging belts 501, 502, 503, 504 can be adjusted to any desired distance by operating the first chain drive 701 for the first submerging belt 501, second chain drive 702 for the second submerging belt 502 third chain drive (not shown) for the third submerging belt, 503, and fourth chain drive (not shown) for the fourth submerging belt 504.

The product is transferred from a first section 201 to a second section 202 by means of a food product transferring device 401; from the second section 202 to the third section 203 by means of a food product transferring device 402 and from the third section 203 to the fourth section 204 by means of food product transferring device 403. The conveyer and submerging belts 301–304 and 501–504 respectively are suspended on a frame 2.

The conveyor belts 301 and 302, submerging belts 501 and 502, the chain drive 701 and the product transferring device 401 are all attached to the frame 2 by means of screws. The vertical supports 601 of framework 2 comprise an extendable section, whereby on operation of a motor 801, a turning mechanism 802 is activated. On activation of the turning mechanism 802, the extendable section of the vertical supports struts 601, is vertically shortened or lengthened. By operating a motor 801, the vertical support struts 601 are shortened or lengthened using a turning device 802 and the conveyor belts 301, 302, 303, 304, and submerging belts 501, 502, 503, 504 are raised or lowered as desired out of into the sections of the container 20. In the drawings particularly FIG. 2 and 2a, the conveyor belts 301 and 302 are indicated in their elevated position from the fryer for clarity of description. The motorized elevating device 801 lifts the submerging belts and conveyor belts out of the oil for cleaning and maintenance purposes. In the normal working position, the conveyors are lowered into the oil.

FIGS. 2 and 2a are magnified side views of the junction between the first section 201 and second section 202 of the frying apparatus. For clarity, the positioning and operation of the conveyor and submerging belts and transferral of the product from one section to another will be discussed with reference to only the first section 201 and second section 202. It will of course be understood that these operations occur with all conveyor and submerging belts and food product transferring devices of this embodiment of the invention.

The product is placed initially on the conveyor belt 301 in the first section 201 and is conveyed through a longitudinal travel path. The submerging belt 501 is located above the conveyor belt 301. The distance between the conveyor belt 301, and the corresponding submerging belt 501 can be varied using the chain drive 701 to lower or raise the submerging belt 501. Similarly, the distance between the second conveyor belt 302 and the corresponding second submerging belt 502 is varied using a second chain drive 702 for raising or lowering the second submerging belt 502 relative to the second conveyor belt 302. Each of the submerging belts 501, 502, 503, 504 comprises a conveyor system which assists the respective corresponding conveyor belts 301, 302, 303, 304 move the product through its longitudinal travel path. When the apparatus is in use, hot oil is held in each of the sections of container 20.

Referring now to FIG. 3, the food product transferring device for transferring products from one section of the container to another section of the container will be described. The transferring device for transferring from the first section to the second section is indicated generally by reference numeral 401. The transferring device 401 includes a rotatable shaft 410 having three vanes 411, 412, 413, fixedly mounted thereon along the length of the shaft 410. The vanes 411, 412, 413 are generally semi-cylindrical in profile with a substantially flat surface and a substantially arcuate surface. The longitudinal axis of each vane 411, 412, 413 is parallel with the longitudinal axis of the shaft 410.

The rotatable shaft 410 is moveable in a slot provided on a guide member 405 between an upper position (indicated by reference numeral (I) on FIG. 3) and a lower position (indicated by reference number (II) on FIG. 3). The guide member 405 and the slot provided thereon in which the shaft 410 can be moved, are arcuate in profile so that the position of the shaft 410 when in the upper position (I) is offset from the position of the shaft when in the lower position (II). (The shaft and vanes when in the lower position (II) are indicated by reference numerals 410' and 411', 412', 413', respectively). Therefore due to the arcuate shaped profile of the slot in the guide member 405, the shaft 410 when in the upper position (I) is located slightly closer to the second conveyor 302 than the shaft 410' when positioned in the lower position (II).

The gauge 408 shown on FIG. 3, is a slot for attaching a metal rod across the width of the food product transferring device to align small flat products and allow better flipping when set on the flipping setting. The graduations on the gauge allow for this metal rod to be aligned correctly across the width.

In both the upper position (I) and lower position (II), the transferring device 401 is effective for transferring food products from the first section to the second section of the frying bath 20, however in the upper position (position I) the device 401 inverts the product so that it is turned upside down through an angle of 180° during transferral, whereas in the lower position (position II), the product is transferred without being turned upside down i.e. the product is transferred onto the second conveyor 302 having the same side up as it had when it was being carried on the first conveyor 301.

Switching the transferring device from the upper position (I) to the lower position (II) is carried out by moving the rotatable shaft 410 in the slot provided on the guide member 405. There is a drive sprocket 406 for the food product transferring device 401. The sprocket 406 is slave driven from the downstream conveyor 302. This sprocket 406 is attached to the food product transferring device centre shaft 410 with a key and is held in place with two retaining rings. As the downstream conveyor 302 rotates, this sprocket 406 rotates causing the turning motion of the food product transferring device 401.

The operation of the transferring device 401 will now be described for transferring food product from the first conveyor belt 301 in the first section 201 to the second conveyor belt 302 in the second section 202. Reference is made initially to the transferring device 401 with the shaft 410 in the upper position (I) in the slot in the guide member 405 as shown in FIG. 2. Rows of food product (doughnuts), emerging from the first conveyor belt 301 are deposited onto the flat surface of a vane, for example, vane 413 shown in the 9 o'clock position on FIG. 3. In use, as the vane 413 is rotated about the rotating shaft 410, the doughnuts are carried on the substantially flat surface of vane 413 and as the vane 413 turns beyond the 1 o'clock position, the doughnuts start to slide off the vane 413 and onto the conveyor belt 302 due to the force of gravity, and they are deposited on the conveyor belt 302 upside down i.e. different side up from the side which was up when the product was on conveyor 301.

The speed at which the transferring device 401 is rotating is synchronised with the speed of the conveyor belt so that one of the vanes 411, 412 or 413 is in the 9 o'clock position and available to receive doughnuts as they emerge from the first conveyor belt 301.

Referring now to FIG. 2a, when the shaft 410' is in the lower position (II) in the slot of guide member 405, the operation of the transferring device is as follows: doughnuts emerging from the first conveyor belt 301 are deposited onto one of the vanes, say 412' for instance. As vane 412' is turned around through its arcuate path, the doughnuts are held on the vane by force of gravity, therefore, the doughnuts are held on the vane until the vane has turned to the 3 o'clock position where the doughnuts are then transferred same side up onto the second conveyor 302.

The row of products are turned twice more during the longitudinal travel path through the frying bath as they are transferred from the second section 202 to the third section 203 and from the third section 203 to the fourth section 204 using the process described above.

It is to be understood that the invention is not limited to the specific details described herein, which are given by way of example only, and that various modifications and alterations are possible without departing from the scope of the invention as defined in the appended claims.

What is claimed is:

1. A frying apparatus for frying a food product, the apparatus comprising;

a container for holding a liquid cooking medium and having an entry side and an exit side;

at least one conveying device for conveying food product from the entry side through the container to the exit side;

at least one submerging device movable between an out-of-use mode in which it is in a raised position and an in-use mode in which it is in a lowered position operative to hold the food product down on the conveyor belt; and a food product transferring device for transferring the product from a first conveying device in a first section of the container to a second conveying device in a second section of the container, the food product transferring device including a rotatable shaft having a plurality of vanes fixedly mounted thereon, the vanes being adapted for receiving food product emerging from the first conveying device and transferring said food product to the second conveying device by rotation of the transferring device such that product emerging from the first conveying device is received onto a vane and carried through an arcuate path until the product falls from the vane onto the second conveying device, the food product transferring device being moveable between two alternative positions, a first position in which the product is flipped upside down through a 180° angle as the product is transferred from one section to another section; and a second position in which the product is conveyed from one section to another section without being flipped through a 180° angle.

2. The frying apparatus as claimed 1, wherein when the submerging device is in the in-use mode, the submerging device is in direct contact with the food product on the conveying device and the submerging device is substantially submerged under the surface of the liquid in the container.

3. The frying apparatus as claimed in claim 2, wherein the submerging device is positioned directly above the conveying device, with a pre-defined distance between the submerging device and the conveying device, said distance being determined by the thickness of the product being conveyed through the liquid within the container.

4. The frying apparatus as claimed in claim 1, wherein the container includes a temperature control device so that in use, temperature of the liquid in the container can be controlled.

5. The new frying apparatus as claimed in claim 4, wherein the container includes a plurality of frying bath sections, each section including a conveying device and a corresponding submerging device.

6. The frying apparatus as claimed in claim 5, wherein the temperature in any section of the container is controllable independently of the temperature in any other section, thereby enabling the product to be conveyed through a plurality of temperatures as may be required by the cooking process.

7. The frying apparatus as claimed in claim 1, wherein each submerging device comprises a traveling belt and the speed at which the belt is traveling can be varied to match that of the conveying device.

8. The frying apparatus as claimed in claim 1, wherein the vanes have a flat surface for receiving a food product and are arranged equi-distant from each other about the shaft.

9. The frying apparatus as claimed in claim 1, wherein the food product transferring device is moveable between the first and second positions by movement in a slot provided in a guide member.

10. The frying apparatus as claimed in claim 9, wherein the food product transferring device is in its first position when the transferring device is in an upper position in the slot and is in its second position when in a lower position in the slot.

* * * * *